3,787,419
N-SUBSTITUTED-α,α,α-TRIFLUORO-
m-TOLUAMIDES
William F. Bruce, Havertown, Pa., assignor to American
  Home Products Corporation, New York, N.Y.
No Drawing. Filed July 1, 1971, Ser. No. 159,059
Int. Cl. C07d 29/28, 29/30, 41/08
U.S. Cl. 260—293.77                        1 Claim

ABSTRACT OF THE DISCLOSURE

Disclosed are α,α,α-trifluoro-m-toluamides wherein the N is substituted with groups such as di(lower)alkylamino-(lower)alkyl, morpholino(lower)alkylamino, N-substituted-3 or 4-piperidylamino, piperidino(lower)alkyl-amino and N-substituted-1,3 or 1,4-hexahydro-1-$\underline{H}$-diazepine. The compounds disclosed possess utility as central nervous system depressants useful in calming animals.

---

This invention relates to new and novel toluamides. Particularly, it relates to new and novel α,α,α-trifluoro-m-toluamides. More particularly, this invention relates to compounds having the formula:

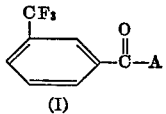

(I)

wherein A is selected from the group consisting of:

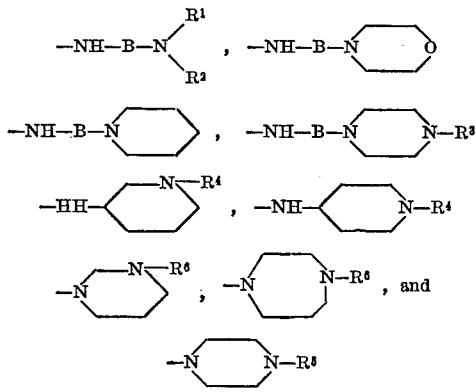

wherein B is (lower)alkylene of from 2 to about 6 carbon atoms; $R^1$ and $R^2$ are selected from the group consisting of hydrogen and (lower)alkyl; $R^3$ is selected from the group consisting of hydrogen, phenyl, (lower)alkyl and α,α,α-trifluoro-m-toluoyl; $R^4$, $R^5$ and $R^6$ are selected from the group consisting of hydrogen, phenyl and (lower)alkyl; and the non-toxic pharmaceutically acceptable acid addition salts thereof.

When used herein, the term "(lower)alkyl" and the like contemplates hydrocarbon radicals, straight and branched chain, containing from about 1 to about 6 carbon atoms, and includes methyl, ethyl, n-propyl, i-propyl, n-butyl, t-butyl, n-pentyl, n-hexyl, 2-methylpentyl and the like. The term "(lower)alkylene" contemplates straight chain hydrocarbon radicals, containing from about 2 to about 6 carbon atoms, and includes methylene, ethylene, propylene, butylene, pentylene and hexylene.

The new and novel compounds of this invention, Formula I, are prepared by contacting m-trifluoromethyl-benzoyl fluoride with an amino compound of formula H—A according to the reation scheme:

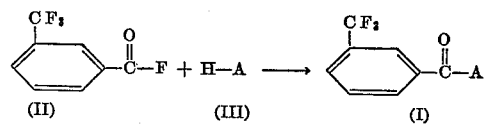

wherein A is as defined hereinabove previously. In practicing the process described above, substantially equimolar mixture of reactants is admixed in a reaction inert organic solvent for a time period ranging up to about twenty hours. The reaction normally proceeds at room temperature; however, heating, such as on a steam bath, will at times aid the reaction. The resulting compounds of Formula I are recovered by routine procedures, i.e., washing with water and recrystallizing the precipitate so formed. The expression "reaction inert organic solvents," as used herein, refers to organic solvents which dissolve the reaction components without interfering with the reaction. All temperatures referred to herein and in the appended claims are in degrees Celsius unless otherwise indicated. The starting materials of Formulae II and III are commercially available or may be provided by methods readily available to those skilled in the art.

In accord with the present invention, the m-(trifluoromethyl)toluamides of Formula I of the present invention have been found to possess interesting pharmacological properties. More particularly, these compounds, in standard pharmacological tests, have exhibited utility as central nervous system depressant agents which are useful in producing a calming effect on animals.

In the pharmacological evaluation of the central nervous system depressant compounds of Formula I of this invention the in vivo effects of the compounds of this invention are tested as follows:

The compound is administered intraperitoneally and/or orally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107,385 (1952)] is used to test for analgesia. The experiment is terminated by subjecting each animal to a maximal electroshock to test for anti-convulsant activity.

The compounds of Formula I of this invention, when administered intraperitoneally in the above test procedure, induce decreased motor activity at a range of 12.7 mg./kg. to 400.0 mg./kg. Similar results are obtained when these compounds are administered orally at a range of 40 mg./kg. to 400.0 mg./kg.

When the compounds of this invention are employed as central nervous system depressant agents to produce a calming effect, they may be administered to warm-blooded animals, e.g., mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients, as starch, milk sugar, certain types of clay and so forth. They may also be administered orally in the form of solutions or they may be injected parenterally. For parenteral administration, they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

N-(2-dimethylaminoethyl)-α,α,α-trifluoro-m-toluamide and maleate

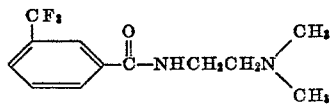

To a solution of 5 g. of N,N-dimethylaminoethylamine in fifty ml. of dimethylformamide (DMF) and 10 ml. of triethylamine is added dropwise 9.5 g. of m-trifluoromethylbenzoyl fluoride. After standing overnight, the mixture is diluted with five volumes of water to give an oil heavier than water. This is taken up in ether, the ether washed with water and dried over potassium carbonate. It is then neutralized by addition of maleic acid in ether. This gives an oil which crystallizes on seeding to give 15 g. of white stubby needles, M.P. 106–107°.

Analysis.—Calcd. for $C_{16}H_{19}F_3N_2O_5$ (percent): C, 51.06; H, 5.09; N, 7.45. Found (percent): C, 50.96; H, 5.04; N, 7.41.

EXAMPLE II

N-(2-diethylaminoethyl)-α,α,α-trifluoro-m-toluamide

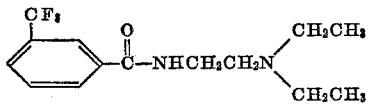

To a solution of 6 g. of N,N-dimethylaminoethylamine in 30 ml. of DMF and 7 ml. of triethylamine is added dropwise 10 g. or m-trifluoromethylbenzoylfluoride. After two hours, 50 ml. of water is added to give a heavy oil which is extracted with ether and distilled, B.P. 150–151°.

Analysis.—Calcd. for $C_{14}H_{19}F_3N_2O$ (percent): C, 58.32; H, 6.64; N, 9.72. Found (percent): C, 58.63; H, 6.51; N, 9.87.

EXAMPLE III

α,α,α-Trifluoro-N-(2-morpholinoethyl)-m-toluamide

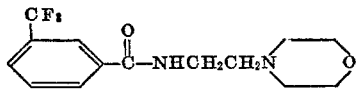

To a solution of 6.5 g. of N-(β-aminoethyl)morpholine in 20 ml. of DMF and 7 ml. of triethylamine is added 9.5 g. of m-trifluoromethylbenzoylfluoride in 20 ml. of DMF, in small portions with shaking. After an hour on a steam bath, the solution is diluted with four volumes of water and extracted four times with ether. Upon neutralization with hydrogen chloride in ether, 8.5 g. of cream colored solid separates, which is recrystallized from ethanol to give 5 g. of white crystals, M.P. 174–175°.

Analysis.—Calcd. for $C_{14}H_{18}ClF_3N_2O_2$ (percent): C, 49.63; H, 5.36; Cl, 10.47; F, 16.83; N, 8.27. Found (percent): C, 50.02; H, 5.53; Cl, 10.4; F, 16.8; N, 8.29.

In a similar manner, using the appropriate starting materials, the following compounds are provided:

α,α,α-trifluoromethyl-N-(6-morpholinohexyl)-m-toluamide;

α,α,α-trifluoromethyl-N-(4-morpholinobutyl)-m-toluamide;

α,α,α-trifluoromethyl-N-(3-morpholinopropyl)-m-toluamide.

EXAMPLE IV

N-[2-(diisopropylamino)ethyl]-α,α,α-trifluoro-m-toluamide and perchlorate

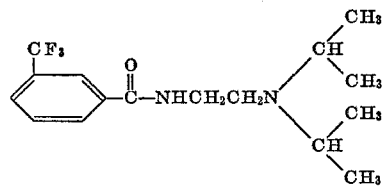

To a solution of 7 g. of diisopropylaminoethylamine in 80 ml. of ether and 9 ml. of triethylamine is added 8 g. of m-trifluoromethylbenzoylfluoride. After two hours of stirring, 100 ml. of water is added and 15 ml. of 50% sodium hydroxide. The ether layer is separated and concentrated on a steam bath in a current of air to remove triethylamine. The residue in ether is neutralized with 60% perchloric acid to give 13 g. of crystalline product, M.P. 121–122°, recrystallized from ethanol to give 10 g. of yellowish-white crystals, M.P. 121–122°.

Analysis.—Calcd. for $C_{16}H_{24}ClF_3N_2O_5$ (percent): C, 46.09; H, 5.08; Cl, 8.51; F, 13.68; N, 6.72. Found (percent): C, 46.16; H, 5.87; Cl, 8.5; F, 13.8; N, 6.85.

EXAMPLE V

N-[2-(diisobutylamino)ethyl]-α,α,α-trifluoro-m-toluamide

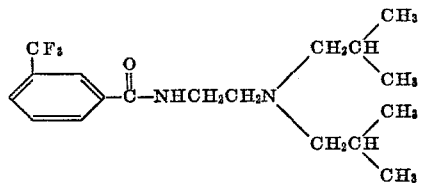

To a solution of 8 g. of diisobutylaminoethylamine in 80 ml. of absolute ether is added dropwise 8 g. of m-trifluoromethylbenzoylfluoride with stirring and cooling. A precipitate appears at once but dissolves before half the acid fluoride is added. The ether solution is washed with sodium carbonate solution and concentrated to give an orange oil which solidifies on cooling and gives 12.5 g. of white felt-like needles upon crystallization from 80% ethanol; M.P. 80–81°.

Analysis.—Calcd. for $C_{18}H_{27}F_3N_2O$ (percent): C, 62.77; H, 7.90; F, 16.55; N, 8.14. Found (percent): C, 62.76; H, 8.08; F, 16.8; N, 8.09.

EXAMPLE VI

N-[3-(di-n-butylamino)propyl]-α,α,α-trifluoro-m-toluamide

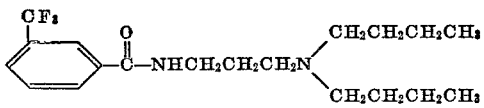

To a solution of 9.5 g. of di-n-butylaminopropylamine in 50 ml. of absolute ether is added 9.5 g. of m-trifluoromethylbenzoylfluoride in 25 ml. of absolute ether, dropwise, with cooling and stirring. After the solution stands overnight, it is washed with 100 ml. of water, which is extracted with ether, all the ether extracts are combined, dried over potassium carbonate, and concentrated to give 15 g. of oil which is distilled, giving 12 g. of very pale yellow product, b$_{0.5}$ 180–185°.

*Analysis.*—Calcd. for C$_{19}$H$_{29}$F$_3$N$_2$O (percent): C, 63.66; H, 8.16; F, 15.90; N, 7.82. Found (percent): C, 63.46; H, 8.27; F, 16.0; N, 7.72.

EXAMPLE VII

N-(1-ethyl-3-piperidyl)-α,α,α-trifluoro-m-toluamide and perchlorate

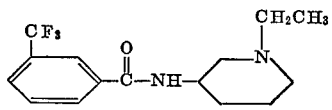

To a solution of 6.7 g. of 3-amino-N-ethylpiperidine in 100 ml. of absolute ether is added slowly with stirring and cooling a solution of 9.6 g. of m-trifluoromethylbenzoylfluoride in 40 ml. of absolute ether, giving a white precipitate which becomes an oil. After standing two days, the ether solution is treated with 50 ml. of water and made alkaline by addition of sufficient 40% sodium hydroxide. Upon drying the ether layer over potassium carbonate and neutralizing it with 60% perchloric acid, a white crystalline salt appears and is recrystallized from water: 10 g., M.P. 176–177°.

*Analysis.*—Calcd. for C$_{15}$H$_{20}$ClF$_3$N$_2$O$_5$ (percent): C, 44.95; H, 5.03; F, 14.22; N, 6.99. Found (percent): C, 45.07; H, 4.92; F, 14.1; N, 6.99.

In a similar manner, using the appropriate starting materials, the following compounds are provided:

N-(1-ethyl-4-piperidyl)-α,α,α-trifluoro-m-toluamide;
α,α,α-trifluoro-N-(3-piperidyl)-m-toluamide;
α,α,α-trifluoro-N-(1-phenyl-4-piperidyl)-m-toluamide;
α,α,α-trifluoro-N-(1-hexyl-3-piperidyl)-m-toluamide;
α,α,α-trifluoro-N-(1-propyl-4-piperidyl)-m-toluamide;
α,α,α-trifluoro-N-(1-propyl-3-piperidyl)-m-toluamide;
α,α,α-trifluoro-N-(1-pentyl-4-piperidyl)-m-toluamide;
α,α,α-trifluoro-N-(1-phenyl-3-piperidyl)-m-toluamide;
α,α,α-trifluoro-N-(4-piperidyl)-m-toluamide.

EXAMPLE VIII

α,α,α-Trifluoro-N-(2-piperidinoethyl)-m-toluamide monohydrate

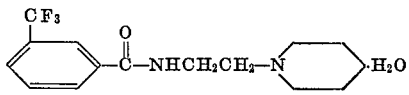

To a solution of 6.5 g. of 2-piperidinoethylamine in 100 ml. of absolute ether is added dropwise with stirring and cooling a solution of 8.6 g. of m-trifluoromethylbenzoylfluoride in 20 ml. of absolute ether. After the mixture stands overnight it is treated with 50 ml. of water and made alkaline by addition of sufficient 40% sodium hydroxide. Concentration of the ether solution gives an oil which crystallizes from ethyl acetate-hexane to give 6 g. of shiny yellow platelets, M.P. 61–62°.

*Analysis.*—Calcd. for C$_{15}$H$_{21}$F$_3$N$_2$O$_2$ (percent): C, 56.59; H, 6.65; F, 17.91; N, 8.80. Found (percent): C, 56.58; H, 6.86; F, 17.9; N, 9.00.

In a similar manner, using the appropriate starting materials, the following compounds are provided:

α,α,α-trifluoromethyl-N-(4-piperidinobutyl)-m-toluamide;
α,α,α-trifluoromethyl-N-(3-piperidinopropyl)-m-toluamide.

EXAMPLE IX

N-[2-(dibutylamino)ethyl]-α,α,α-trifluoro-m-toluamide and maleate

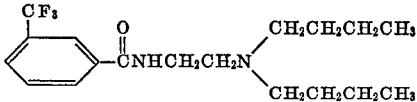

To 5 g. of 2-di-n-butylaminoethylamine in 130 ml. of absolute ether is added 6 g. of m-trifluoromethylbenzoylfluoride in 20 ml. of absolute ether with cooling and shaking. After standing overnight, the solution is washed with dilute sodium hydroxide, the ether dried over potassium carbonate, and acidified with a solution of maleic acid in ether. The light yellow oil which separates solidifies upon being scratched and is recrystallized from methyl acetate-heptane to give 6.5 g. of very light fluffy white crystals, M.P. 91–92°.

*Analysis.*—Calcd. for C$_{22}$H$_{31}$N$_2$F$_3$O$_5$ (percent): C, 57.38; H, 6.79; F, 12.38; N, 6.09. Found (percent): C, 57.46; H, 6.99; F, 12.4; N, 6.32.

EXAMPLE X

α,α,α-Trifluoro-[4-(diisopropylamino)butyl]-m-toluamide

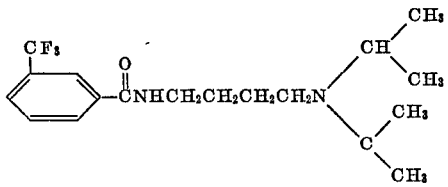

To a solution of 10 g. of 4-diisopropylaminobutylamine in 100 ml. of absolute ether is added, dropwise with stirring, 12.5 g. of m-trifluoromethylbenzoylfluoride in 30 ml. of absolute ether. After the solution stands overnight, it is washed with water and dilute sodium hydroxide and dried over potassium carbonate. The solution is then concentrated and distilled to give 11 g. of clear light yellow oil b$_{0.2}$ 175–179°.

*Analysis.*—Calcd. for C$_{18}$H$_{27}$F$_3$N$_2$O (percent): C, 62.77; H, 7.90; F, 16.54; N, 8.14. Found (percent): C, 62.44; H, 7.68; F, 16.1; N, 8.05.

EXAMPLE XI

α,α,α-trifluoro-N-(2-[4-(α,α,α-trifluoro-m-toluoyl)piperazino]ethyl)-m-toluamide and hydrochloride

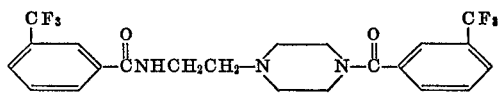

A solution of 19 g. of m-trifluoromethylbenzoylfluoride in 50 ml. of absolute ether is added, dropwise with stirring and cooling, to 6.5 g. of N-(β-aminoethyl)piperazine in 100 ml. of absolute ether. After standing overnight, the solution is washed with water and dilute sodium hydroxide, and dried over potassium carbonate. After filtering out a small amount of fluffy by-product, an ethereal solution of hydrogen chloride is added to give a white solid, 9 g., M.P. 235–237°; recrystallized from ethanol, this gives 7 g. of flaky white crystals, M.P. 235–236°.

*Analysis.*—Calcd. for C$_{22}$H$_{22}$ClF$_6$N$_3$O$_2$ (percent): C, 51.82; H, 4.35; Cl, 6.95; F, 22.36; N, 8.24. Found (percent): C, 51.94; H, 4.22; Cl, 6.9; F, 21.9; N, 8.20.

In a similar manner, using the appropriate starting materials, the following compounds are provided:

α,α,α-trifluoro-N-(2-piperazinoethyl)-m-toluamide;
α,α,α-trifluoro-N-(4-phenyl-2-piperazinoethyl)-m-toluamide;
α,α,α-trifluoro-N-(4-propyl-3-piperazinopropyl)-m-toluamide;

N-(4-ethyl-4-piperazinobutyl)-α,α,α-trifluoro-m-toluamide;
N-(4-ethyl-2-piperazinoethyl)-α,α,α-trifluoro-m-toluamide.

EXAMPLE XII 1-methyl-4-(α,α,α-trifluoro-m-toluoyl)piperazine and hydrochloride

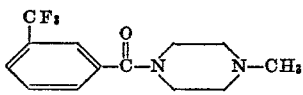

A solution of 10 g. of m-trifluoromethylbenzoylfluoride in 30 ml. of absolute ether is added dropwise with shaking and cooling to 6 g. of N-methylpiperazine in 80 ml. of absolute ether. After standing overnight, the solution is washed with dilute sodium hydroxide and the ether layer, dried over potassium carbonate, and acidified with ethereal hydrogen chloride to give 11 g. of white crystals, M.P. 285° with sublimation. Recrystallization from methanol gives 8 g. of powdery white solid, M.P. 285–286° with sublimation.

*Analysis.*—Calcd. for $C_{13}H_{16}ClF_3N_2O$ (percent): C, 50.57; H, 5.22; Cl, 11.49; F, 18.46; N, 9.08. Found (percent): C, 50.59; H, 5.08; Cl, 11.5; F, 18.6; N, 9.13.

In a similar manner, using the appropriate starting materials, the following compounds are prepared:

4-(α,α,α-trifluoro-m-toluoyl)piperazine;
4-(α,α,α-trifluoro-m-toluoyl)piperazine sulfate;
1-ethyl-4-(α,α,α-trifluoro-m-toluoyl)piperazine;
1-pentyl-4-(α,α,α-trifluoro-m-toluoyl)piperazine.

EXAMPLE XIII 1-phenyl-4-(α,α,α-trifluoro-m-toluoyl)piperazine and hydrochloride

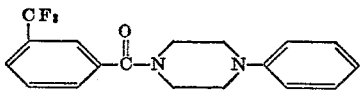

A solution of 10 g. of m-trifluoromethylbenzoylfluoride in 20 ml. of absolute ether is added, dropwise with stirring and cooling, to 8.1 g. of N-phenylpiperazine in 100 ml. of absolute ether. After standing overnight, the solution is washed with dilute sodium hydroxide and the ether solution, dried over potassium carbonate, is acidified with ethereal hydrogen chloride to give 22 g. of white solid, M.P. 171–172°. Recrystallization from ethanol gives 14 g. of white granular crystals, M.P. 172–173°.

*Analysis.*—Calcd. for; $C_{18}H_{17}F_3N_2O \cdot HCl$: C, 58.30; H, 4.89; Cl, 91.56; F, 15.37; N, 7.56. Found: C, 58.41; H, 4.75; Cl, 9.5; F, 15.5; N, 7.87.

EXAMPLE XIV

Hexahydro-1-methyl-4-(α,α,α-trifluoro-m-toluoyl-1-H-1,4-diazepine and hydrochloride

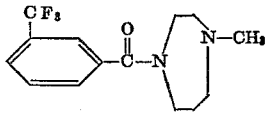

A solution of 10 g. of m-trifluoromethylbenzoylfluoride in 20 ml. of absolute ether is added, dropwise with cooling and shaking, to 6 g. of N-methylhomopiperazine in 100 ml. of absolute ether. After standing overnight, this mixture is washed with dilute sodium hydroxide. The ether, dried over potassium carbonate, is acidified with ethereal hydrogen chloride to give an oil which becomes solid on standing and seeding. Recrystallization from 90% ethanol gives 9 g. of white microcrystals, M.P. 214–215°.

*Analysis.*—Calcd. for $C_{14}H_{18}ClF_3N_2O$ (percent): C, 52.10; H, 5.62; Cl, 10.98; F, 17.66; N. 8.68. Found (percent): C, 52.00; H, 5.85; Cl, 11.1; F. 17.9; N, 9.04.

In a similar manner, using the appropriate starting materials, the following compounds are provided:

3-(α,α,α-trifluoro-m-toluoyl) - hexahydro-1 - H-1,3-diazepine sulfate;
4-(α,α,α-trifluoro-m-toluoyl) - hexahydro-1 - phenyl-H-1,4-diazepine;
1-ethyl-3-(α,α,α-trifluoro-m-toluoyl)-hexahydro-1 - H-1,3-diazepine;
1 - ethyl-4-(α,α,α-trifluoro-m-toluoyl)-hexahydro-1-H-1,4-diazepine;
3-(α,α,α-trifluoro - m-toluoyl)-hexahydro-1 - propyl-1-H-1,3-diazepine;
4-(α,α,α-trifluoro-m - toluoyl)-hexahydro-1-H-1,4 - diazepine;
3-(α,α,α-trifluoro-m-toluoyl) - hexahydro-1-phenyl - 1-H-1,3-diazepine;
4-(α,α,α - trifluoro-m-toluoyl)-hexahydro-1-pentyl-1 - H-1,4-diazepine.

What is claimed is:
1. N-(1-ethyl-3-piperidyl)-α,α,α-trifluoro-m - toluamide-perchlorate.

References Cited
UNITED STATES PATENTS

| | | | |
|---|---|---|---|
| 2,748,134 | 5/1956 | Stoll et al. | 260—293.77 |
| 3,647,805 | 3/1972 | Irikura et al. | 260—293.77 |
| 2,785,200 | 3/1957 | Moore | 260—558 D |
| 3,177,252 | 4/1965 | Thominet | 260—293.77 |
| 3,502,652 | 3/1970 | Jucker et al. | 260—239 B C |
| 3,509,166 | 4/1970 | Wright et al. | 260—558 R |

OTHER REFERENCES

Johnson et al., Chem. Abstracts, vol. 70, Abstract No. 28589t (1969). QDIA51.

AITON D. ROLLINS, *Primary Examiner*

U.S. Cl. X.R.

260—239 BC, 247.2 A, 251, 268 R, 268 C, 268 PH, 558 R; 424—244, 248, 250, 251, 267, 324